May 17, 1949.　　　　A. H. EBERMAN　　　　2,470,294
AIRCRAFT RELEASE DEVICE
Filed May 10, 1945　　　　　　　　　　　　2 Sheets-Sheet 1
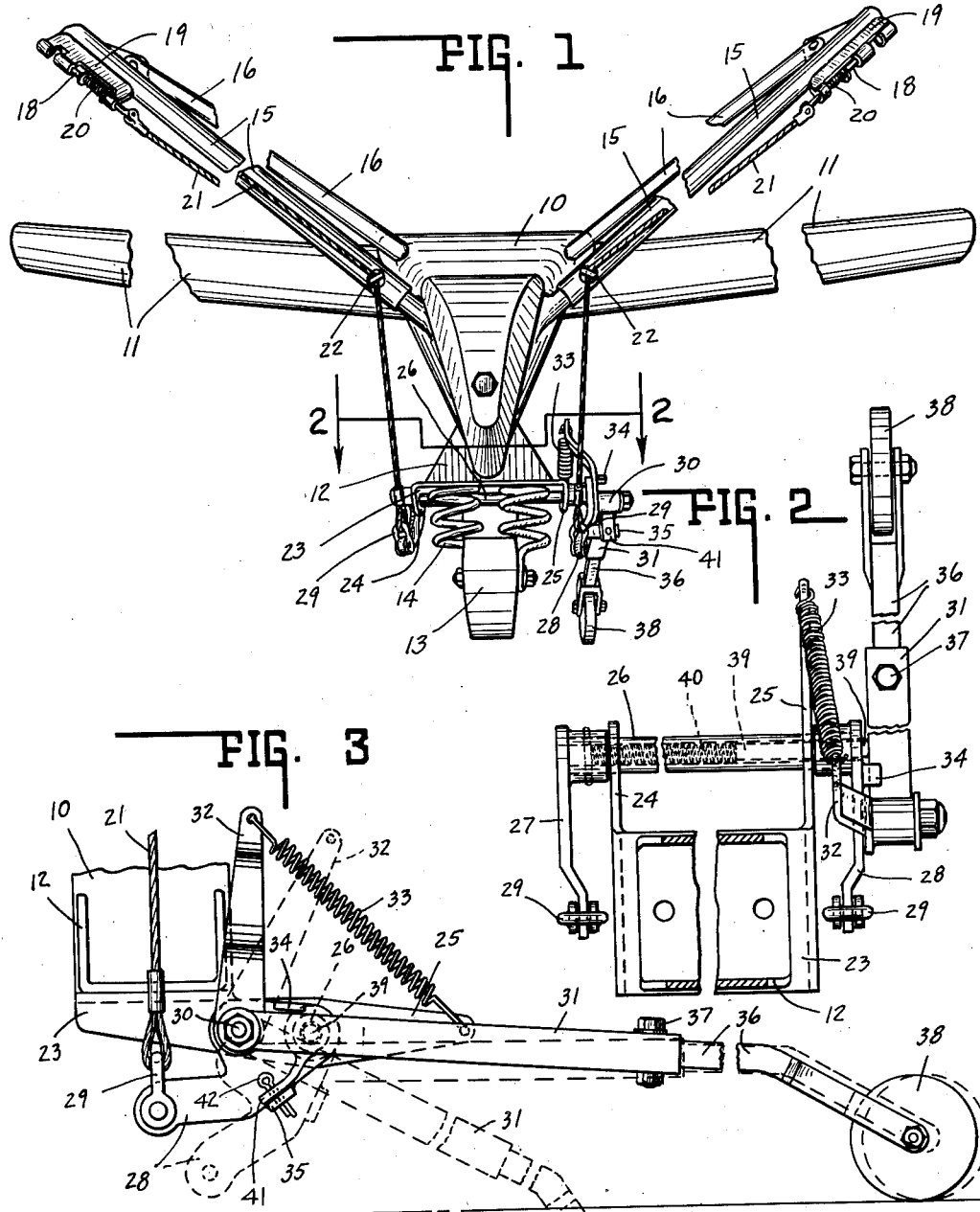
INVENTOR.
AUGUSTUS H. EBERMAN.
BY
Lockwood, Goldsmith & Galt.
ATTORNEYS.

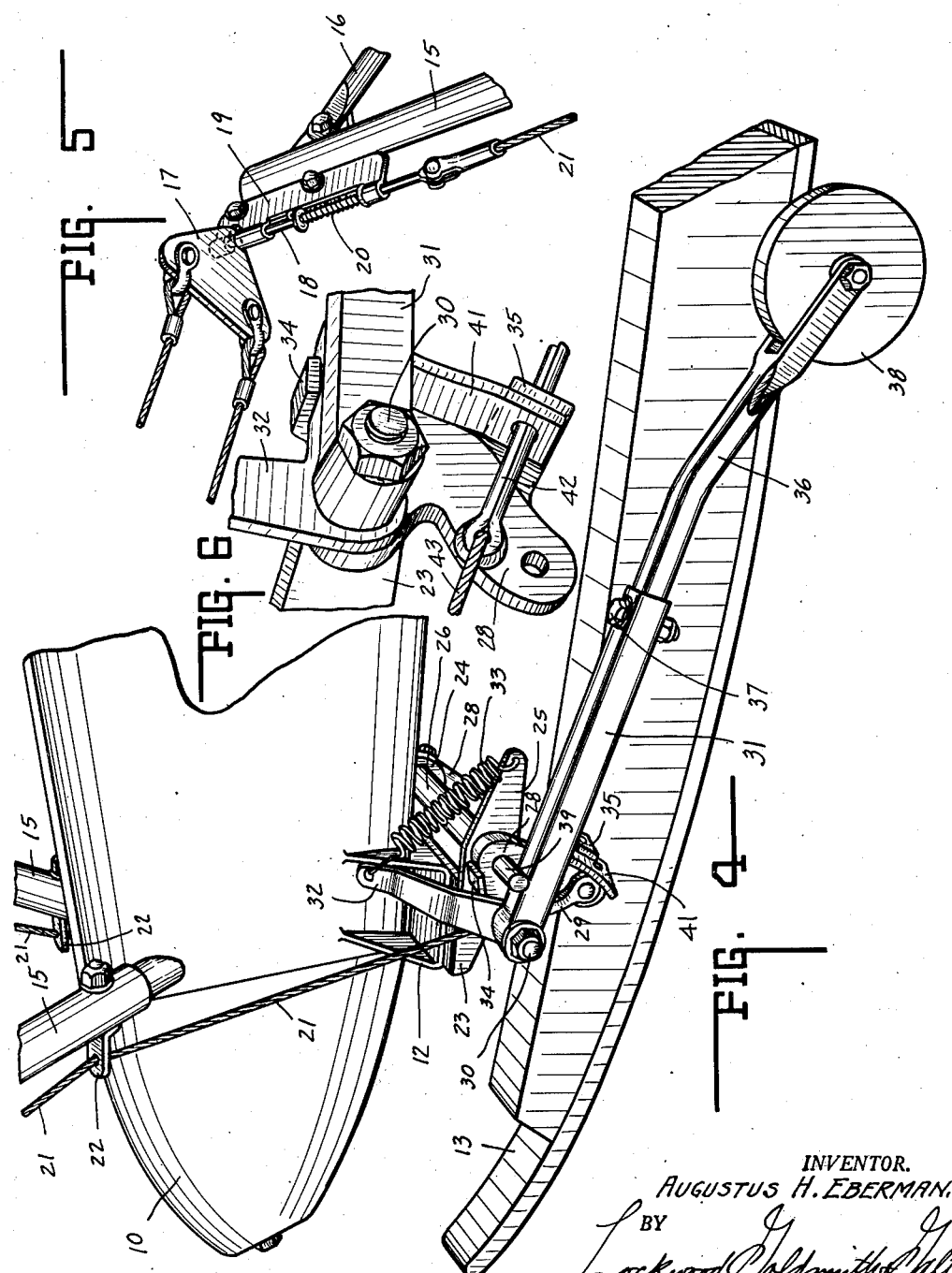

Patented May 17, 1949

2,470,294

UNITED STATES PATENT OFFICE 2,470,294

AIRCRAFT RELEASE DEVICE

Augustus H. Eberman, Geneva, Ill., assignor to The Rudolph Wurlitzer Company, Chicago, Ill., a corporation Application May 10, 1945, Serial No. 593,040

8 Claims. (Cl. 244—3)

This invention relates to an aircraft release device for an aircraft whereby the tow bridle or other mechanism is automatically released as, or just prior to the aircraft contacting the ground in being landed.

In towed aircraft, particularly such aircraft as target gliders, personnel or cargo gliders, it is desirable that the tow bridle be released at its connection with the towed craft, and that that release be effected automatically as, or just prior to the grounding thereof. By means of this invention damage to the aircraft is avoided, such as may occur upon its striking and bouncing on the ground before its release from the towing airplane. Such arrangement also relieves the pilot of the towing airplane from the responsibility of releasing the tow bridle simultaneously with the grounding of the aircraft. This is accomplished by providing an attachment, mounted upon the under carriage of the towed aircraft, which is releasably connected with the tow bridle in such manner as to be ineffective prior to and during the towing of the aircraft, but which is automatically actuated to release the tow bridle upon striking the ground immediately prior to or upon the towed aircraft being landed.

The full nature of the invention will be understood from the accompanying drawings and the following description and claims.

Fig. 1 is a front elevation of a towed aircraft showing the release mounted thereon and with parts broken away.

Fig. 2 is a plan view of the release control.

Fig. 3 is a side elevation of the release control showing in full lines its position before the aircraft leaves the ground; in downwardly extended latching position as illustrated by dotted lines after the aircraft has left the ground; and in latched releasing position after the aircraft has landed, as shown by dotted lines slightly offset from its original position shown in full lines.

Fig. 4 is a perspective view showing the position of the release control in latched tow bridle releasing position after the aircraft has landed.

Fig. 5 is a perspective view of the tow bridle release actuated by the release control.

Fig. 6 is a perspective view showing the pivotal mounting of the control arm with its arming bracket and pin in arming position.

In the drawings there is illustrated for example a towed aircraft including the fuselage 10, wings 11, under carriage bracket plates 12 and central landing skid 13 carried by the bumper springs 14. Extending upwardly and outwardly from the fuselage there is a pair of bridle plate arms 15 reinforced by the bracing rods 16.

The tow bridle comprises a pair of cables connected to a bridle plate 17 (Fig. 5), there being a pair of said cables and one such bridle plate for releasable connection with each of the bridle plate arms 15. The tow bridle, comprising the cables, is suitably connected to the towing machine or airplane.

Each of the bridle plates is releasably latched in towing position by a releasing pin 18, said pin being slidably mounted in a bridle plate release bracket 19 rigidly secured to the upper end of each of the bridle plate arms 15. Said bracket is slit to receive the plate 17 which is provided with a hole therein through which the release pin extends under compression of a retaining spring 20. The release pin is connected with a draw cable 21 running along the respective arms 15 and through an eye bolt 22 securing the arms to the fuselage. By pulling downwardly upon the draw cables 21, the release pin will be retracted against the compression of the spring 20 out of engagement with the bridle plate 17 for releasing it from the towed aircraft.

Secured to the forward bracket plate 12 there is provided a transverse bearing plate 23 having rearwardly and downwardly extending bearing arms 24 and 25, arm 25 extending rearwardly somewhat beyond arm 24. Extending transversely of the plate 23 and having its bearing in arms 24, 25, there is a tubular shaft 26. Pinned or keyed to the outer ends of the shaft 26 for oscillation therewith, there is a pair of actuating arms 27, 28. The free ends of the actuating arms 27, 28 are connected respectively with the draw cables 21 through the links 29. Thus, upon the actuating arms 27, 28 being forced downwardly, they will act to draw the cables 21 downwardly and thereby effect the release of the pins 18 from the bridle plates.

Pivotally mounted on the actuating arm 28 forwardly of its mounting on the shaft 26 at 30, there is a release control arm 31. Said control arm is in the form of a bell crank lever fulcrumed at 30 and having an upstanding arm 32 connected at its free end with one end of a tension spring 33. The other end of said tension spring is anchored to the extreme rear end of the elongated fixed bearing arm 25. The actuating arm 28 carries an overlapping lug 34 engageable by the release control arm 31 to limit its upward movement, and is also provided with a similar outwardly extending lug 35 to limit its downward swinging movement.

The release control arm is preferably in the form of a square tube having a smooth flat surface toward the actuating arm 28 and being adapted to telescopically receive a squared extension 36 adjustable therein by a lock pin 37. Said extension is bifurcated and slightly bent downwardly to provide a bearing fork for a contact wheel 38. The tubular shaft 26 is adapted to receive a retractable locking pin 39 slidable therein. The retractable locking pin is urged outwardly by a compression spring 40 bearing against a plug in said shaft held in place by the pin securing arm 27 to said shaft 26. Said arm 31 carries a downwardly extending perforated arming bracket 41 arranged to extend over the lug 35 when said arm is in elevated position, as shown by full lines in Figs. 3 and 6. The lug 35 is perforated to receive an arming pin 42 to lock said arm in its elevated inoperative position. An arming wire 43 is connected to said pin for manually withdrawing the pin after the aircraft has completely cleared the ground.

In operation, when the aircraft is resting on the ground preparatory to being towed, the release control arm 31 is in the position shown in Figs. 1 and 2 and as shown in full lines in Fig. 3. In this position wheel 38 is resting upon the ground, spring 33 is under tension and the locking pin 39 is pressed by spring 41 against the inner surface of the squared control arm. Also in this position the actuating arms 27, 28 are in their uppermost position, permitting, through cables 21, the release pins 18 to be held by their respective springs 20 in bridle plate latching engagement, and the arming pin 42 is in arming position.

Upon the towed aircraft leaving the ground, the arming pin is pulled to release the control arm, permitting it to drop downwardly by gravity urged by spring 33 to its lowermost position, as shown by dotted lines in Fig. 3. It will swing downwardly to such lowermost position about its pivotal or fulcrum mounting at 30 carried by the actuating arm 28. This will not disturb the position of either arm 28 or arm 27, such as to withdraw the release pins 18. The control arm will hang in this position while the aircraft is in the air. In this position it will have disengaged and freed the locking pin 39 which will be forced over the arm to the position shown in Fig. 4 under compression of spring 41. The pin in this position will interlock the fulcrumed control arm with actuating arm 28 and its connected arm 27. But in such downward position said actuating arms will be unaffected.

Upon landing, as the skid 13 is about to contact the ground, the lowered wheel 38 on the control arm will first engage the ground and raise the control arm against locking pin 39 to swing the actuating arms 28 and 27 downwardly to the position shown in Fig. 4 and also as shown in dotted lines in Fig. 3. Said actuating arms will thus be caused to swing downwardly about their bearing support axially of shaft 26 and pin 39. This, of course, will give the release control arm a slightly offset position, as shown by the dotted lines closely associated with the full lines in Fig. 3. Such downward swinging movement of arms 28, 27 will draw the cables 21 downwardly to release the pins 18 from locking engagement with the bridle plate 17.

It will be apparent from the foregoing that immediately upon the aircraft first engaging the ground in landing, the tow bridle connecting it with the towing airplane or machine will be immediately and automatically released so that there will be no towing thereof on the ground such as to cause it to nose over or otherwise be damaged.

The invention claimed is:

1. An aircraft release device including a control arm movably mounted upon the under carriage of the aircraft for ground contact, a releasable latch mounted on said aircraft, a connection between said control arm and latch, and elongated means slidably mounted and normally constrained to locking position and effective upon said arm leaving the ground to interlock said arm and latch connection and move said latch to releasing position upon displacement of said arm in striking the ground.

2. An aircraft release device including a control arm having one end pivotally mounted upon the under carriage of the aircraft and the free end thereof extending downwardly therefrom for ground contact, a releasable latch mounted on said aircraft, an interlocking member carried by said aircraft associated with said arm, a cable connecting said latch to said member, and elongated means slidably mounted and normally constrained to locking position and effective upon said arm swinging downwardly on the aircraft leaving the ground to interlock said arm and member for releasing said latch upon said arm being swung upwardly in striking the ground.

3. An aircraft release device including a control arm pivotally mounted at one end to the under carriage of the aircraft with its free end normally supported upon the ground, a latch movable into and out of latching engagement, an interlocking member associated with the pivotal mounting of said arm, a connection between said member and latch, and elongated means on said member slidably mounted and normally constrained to locking position and normally inoperative when said arm is resting upon the ground movable to interlock said member and arm upon the latter swinging downwardly upon leaving the ground, said member being effective through its connection with said latch to release said latch upon actuation when said interlocked arm is raised upon striking the ground.

4. An aircraft release device including a lever pivotally connected to the under carriage of the aircraft, a releasable connection between said lever and release device, a control arm having one end pivotally connected with said lever and the other end normally resting upon the ground, and an elongated spring actuated interlocking element slidably mounted and normally constrained to locking position and held in inoperative position under spring tension by said arm when said aircraft is on the ground and releasable by said arm upon said arm dropping down about its pivotal mounting upon leaving the ground to thereby interlock said lever and arm, whereby said lever will be caused to swing about its pivotal mounting to releasing position upon said control arm being raised as it strikes the ground upon landing of the aircraft.

5. An aircraft release device including a lever pivotally connected at one end to the under carriage of the aircraft, a releasable connection between the opposite end of said lever and the release device, a control arm having one end pivotally connected intermediate the ends of said lever and the other end of said arm normally resting upon the ground, and a spring actuating retractible pin extending through the pivotal mounting of said lever into abutting engagement with the side of said control arm when in its normal rest position and movable to extend over the top side thereof upon said arm dropping to a lowered position when leaving the ground, whereby upon said arm being raised by striking the ground when landing the aircraft it will engage said pin to swing said lever to releasing position.

6. An aircraft release device including a supporting bracket mounted to the under carriage of the aircraft extending thereunder from one side to the other, a tubular shaft mounted for rotation by said bracket, a pair of brackets carried by said shaft on opposite sides of said bracket, releasing means connected with the opposite ends of said lever for releasing said device upon being drawn downwardly by the downward swinging movement of said lever, a control arm having one end pivoted to one of said levers intermediate its ends with the other end of said control arm normally resting on the ground, and a retractible spring actuated locking pin slidable within said tubular shaft with its end normally engaging the inner side of said arm under spring tension and movable outwardly to extend over said arm when said arm is permitted to drop to lower position upon leaving the ground, whereby upon said arm being raised from its lower position upon striking the ground in landing its engagement with said pin will swing said lever downwardly to tow line releasing position.

7. An aircraft tow bridle release including a bracket extending across and secured to the under carriage of the aircraft and having a rearwardly extending arm on one side thereof, a tubular shaft mounted for rotation in said bracket, a lever secured to each end of said shaft, a tow bridle releasing pin connected with each side of said aircraft for releasable engagement with the tow bridle, a cable connecting each of said pins with the free ends of said levers for retracting said pins to tow bridle releasing position upon said levers being swung downwardly on said shaft, a control arm having one end pivotally mounted on one of said levers with its other end extending substantially laterally for ground support, an arm fixed to said control arm extending upwardly therefrom, a tension spring connected with the end of said last-mentioned arm and the end of said bracket arm tending to force said control arm downwardly under spring tension, limit stops carried by said last-mentioned lever for limiting the pivotal movement of said control arm relative thereto, and a spring pressed retractible locking pin slidably mounted in said tubular shaft in engagement with the side of said control arm when in rested position and movable outwardly to extend over said arm when moved to lowered position when leaving the ground, whereby said locking pin will cause the pivoted end of said control arm to swing said levers downwardly to release the tow bridle upon said control arm being swung upwardly from lowered position by ground contact upon landing of the aircraft.

8. An aircraft tow bridle release including a bracket extending across and secured to the under carriage of the aircraft and having a rearwardly extending arm on one side thereof, a tubular shaft mounted for rotation in said bracket, a lever secured to each end of said shaft, a tow bridle releasing pin connected with each side of said aircraft for releasable engagement with the tow bridle, a cable connecting each of said pins with the free ends of said levers for retracting said pins to tow bridle releasing position upon said levers being swung downwardly on said shaft, a control arm having one end pivotally mounted on one of said levers, said control arm comprising a square tube having an extension adjustable longitudinally thereof, a ground contact wheel carried by said extension with its other end extending substantially laterally for ground support, an arm fixed to said control arm extending upwardly therefrom, a tension spring connected with the end of said last-mentioned arm and the end of said bracket arm tending to force said control arm downwardly under spring tension, limit stops carried by said last-mentioned lever for limiting the pivotal movement of said control arm relative thereto, and a spring pressed retractible locking pin slidably mounted in said tubular shaft in engagement with the side of said control arm when in rest position and movable outwardly to extend over said arm when moved to lowered position when leaving the ground, whereby said locking pin will cause the pivoted end of said control arm to swing said levers downwardly to release the tow bridle upon said control arm being swung upwardly from lowered position by ground contact upon landing of the aircraft.

AUGUSTUS H. EBERMAN.

REFERENCES CITED

The following references are of record in the file of this patent:

UNITED STATES PATENTS

| Number | Name | Date |
|---|---|---|
| 1,418,783 | Fokker | June 6, 1922 |
| 1,427,665 | Weis | Aug. 29, 1922 |

FOREIGN PATENTS

| Number | Country | Date |
|---|---|---|
| 552,749 | Great Britain | Apr. 22, 1943 |